Figures 1, 2:
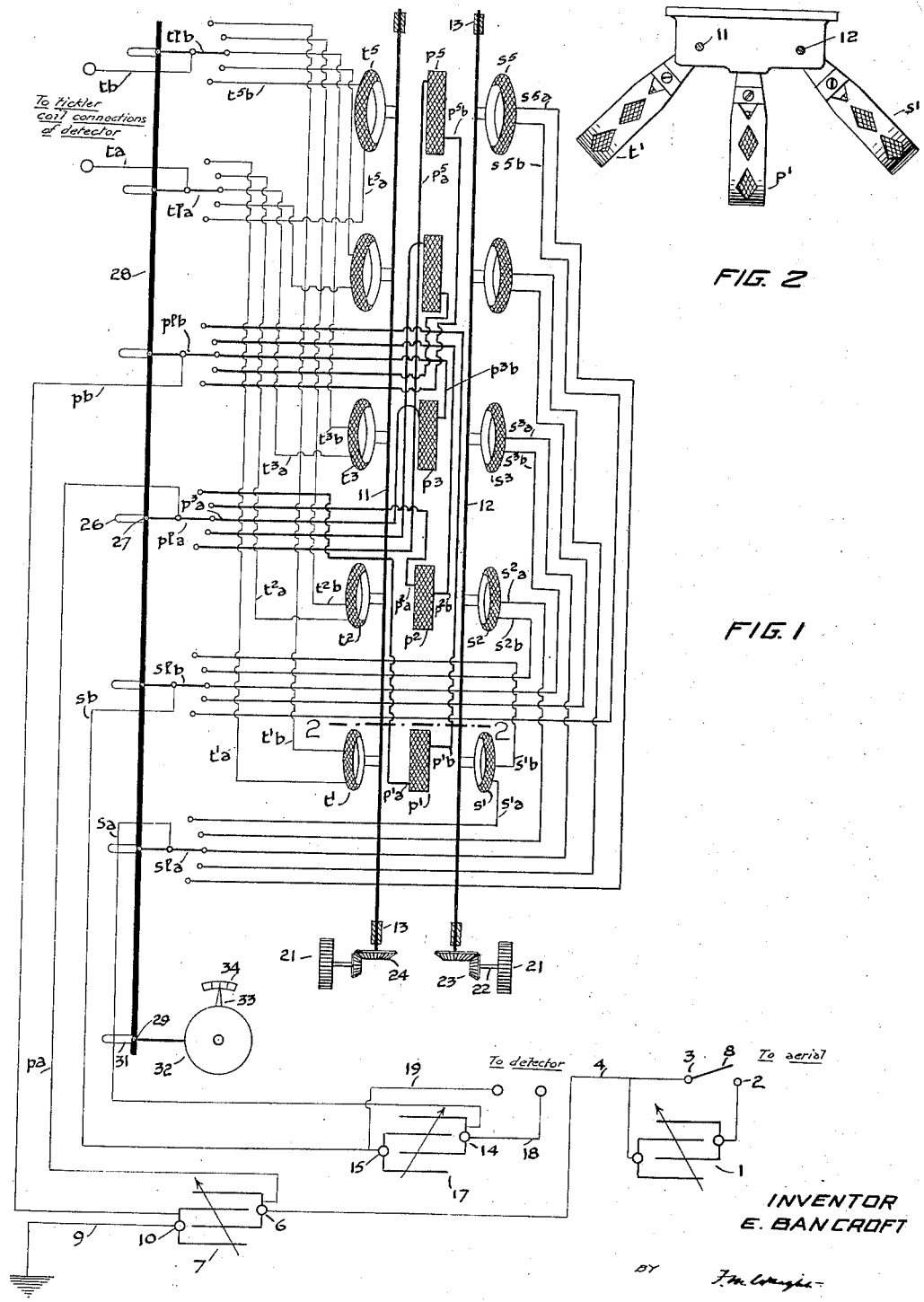

E. BANCROFT.
WIRELESS SYNCHRONIZER.
APPLICATION FILED DEC. 19, 1919.

1,363,032.

Patented Dec. 21, 1920.

INVENTOR
E. BANCROFT

ATT'Y.

UNITED STATES PATENT OFFICE.

ERNEST BANCROFT, OF SONOMA, CALIFORNIA.

WIRELESS SYNCHRONIZER.

1,363,032.    Specification of Letters Patent.    Patented Dec. 21, 1920.

Application filed December 19, 1919. Serial No. 345,980.

*To all whom it may concern:*

Be it known that I, ERNEST BANCROFT, a citizen of the United States, residing at Sonoma, in the county of Sonoma and State of California, have invented new and useful Improvements in Wireless Synchronizers, of which the following is a specification.

This invention relates to wireless timers, and the object of the present invention is to provide an apparatus for timing the oscillations sent to the detector to correspond to the oscillations coming to the aerial, which will be rapid and certain in its action.

A further object is to provide an apparatus for rapidly and conveniently simultaneously varying the distances of all the inductance coils of the tickler from the primary inductance coils and also simultaneously of all the inductance coils of the secondary circuit from the primary inductance coils, so that such coils may be capable of being used for various wave lengths.

In the accompanying drawing, Figure 1 is a diagrammatic view of my invention; Fig. 2 is a sectional view on the line 2—2 of Fig. 1.

Referring to the drawing, 1 indicates a variable condenser having a pole 2 adapted to be connected to an aerial. The other pole 3 of the condenser is connected by a wire 4 to the pole 6 of the primary variable condenser 7. The condenser 1 is employed only when it is necessary to reduce the lengths of the oscillations arriving at the aerial and a switch 8 is employed to cut out the condenser 1 when not needed.

From the pole 6 of the condenser 7 leads a wire $pa$ to a lever $pla$, which, as shown, contacts with the end of a wire $p^3a$, leading to an inductance coil $p^3$, from which inductance coil a wire $p^3b$ leads, the end of said wire being shown as electrically connected to a lever $plb$ which is connected to a wire $pb$ connected with the other pole 10 of said primary variable condenser 7, a wire 9 leading therefrom to the ground.

Closely adjacent to the inductance coil $p^3$ and on opposite sides thereof are inductance coils $t^3$ and $s^3$, secured to rods 11, 12 of insulating material rotatable about their axes in bearings 13.

Wires $s^3a$ and $s^3b$ lead into proximity to levers $sla$, $slb$, and, as here shown, are in contact therewith, from which levers wires $sa$, $sb$, lead to poles 14, 15 of a secondary variable condenser 17 from which poles wires 18, 19 lead to the detector of the apparatus.

From the inductance coil $t^3$ wires $t^3a$, $t^3b$ lead into proximity to, and, as here shown, are in contact with, levers $tla$, $tlb$, from which levers wires $ta$, $tb$, lead to the tickler coil connections of the detector.

By varying the proximity of the coils $t^3$, $s^3$ to the coil $p^3$, the signal lengths proceeding therefrom can be varied as desired. This variation may be accomplished by turning the rods about their axes which can be done by turning two buttons or handles 21 mounted on shafts 22 which carry beveled pinions 23 which mesh with bevel pinions 24 on the ends of the rods 11 and 12. For the sake of clearness of illustration the shafts 22 are shown in the diagrammatic figure in the same plane, although in actual practice, they will extend in parallel planes and the buttons or handles 21 will be in front of the beveled pinions.

This set of inductance coils heretofore described is only one of a series of sets of inductance coils of varying capacities. I have here shown five of such sets of inductance coils suitable for wave lengths ranging from one hundred to twenty five thousand meters, the range of each set overlapping slightly the ranges of the sets of inductance coils of next lower and higher ranges. These inductance coils $t^1$, $p^1$, $s^1$, $t^2$, $p^2$, $s^2$—$t^5$, $p^5$, $s^5$, are respectively connected to wires $t^1a$, $t^1b$, $p^1a$, $p^1b$, $s^1a$, $s^1b$, $t^2a$, $t^2b$, $p^2a$, $p^2b$, $s^2a$, $s^2b$—$t^5a$, $t^5b$, $p^5a$, $p^5b$, $s^5a$, $s^5b$, which extend into proximity to the levers $tla$, $tlb$, $pla$, $plb$, $sla$, $slb$.

These levers have slotted arms 26 which receive pins 27 extending from an insulated rod 28 having a pin 29 received by a slotted arm 31 movable with a wave length change-over switch 32 having an indicator 33 movable over a graduated arc 34. By turning said switch 32, any one of the sets of inductance coils suitable for receiving oscillations of any desired length can be brought into operation, and by turning the buttons or handles 21, inductance coils of the tickler or secondary circuit can be moved nearer to, or farther from, the primary inductance coils as desired, to obtain the best results with the selected coils for the necessary wave length.

I claim:

1. The combination with a primary variable condenser, of which one pole is adapted to be connected with an aerial and the other pole with the ground, a secondary variable condenser of which the poles are electrically connected with the detector, and a tickler, two pairs of movable conducting elements electrically connected respectively, one pair with the primary condenser and the other pair with the secondary condenser, a series of sets of inductance coils, wires from the inductance coils of each set leading into proximity to said elements to be electrically connected therewith by the movement of said elements, each set comprising a primary inductance coil, the wires therefrom leading into proximity with the pair of elements electrically connected to the primary condenser, and a secondary inductance coil, the wires therefrom leading into proximity to the pairs of elements electrically connected to the secondary condenser, and means for moving all of said elements in unison to make electrical connections with the inductance coils of any one of said sets.

2. The combination with a primary variable condenser, of which one pole is adapted to be connected with an aerial and the other pole with the ground, a secondary variable condenser of which the poles are electrically connected with the detector, and a tickler, a series of pairs of movable conducting elements electrically connected respectively, one pair with the primary condenser, another pair with the secondary condenser, and the remaining pair with the tickler coil connections of the detector, a series of sets of inductance coils, wire from the inductance coils of each set leading into proximity to said elements to be electrically connected therewith by the movement of said elements, each set comprising a primary inductance coil, the wires therefrom leading into proximity with the pair of elements electrically connected to the primary condenser, a secondary inductance coil, the wires therefrom leading into proximity to the pairs of elements electrically connected to the secondary condenser, and a tickler inductance coil, the wires therefrom leading into proximity with the pairs of elements electrically connected to the tickler coil connections of the detector, and means for moving all of said elements in unison to make electrical connections with the inductance coils of any one of said sets.

3. The combination with a primary variable condenser, of which one pole is adapted to be connected with an aerial and the other pole with the ground, a secondary variable condenser of which the poles are electrically connected with the detector, two pairs of movable conducting elements electrically connected respectively, one pair with the primary condenser, and the other pair with the secondary condenser, a series of sets of inductance coils, wires from the inductance coils of each set leading into proximity to said elements to be electrically connected therewith by the movement of said elements, each set comprising a primary inductance coil, the wires therefrom leading into proximity with the pair of elements electrically connected to the primary condenser, and a secondary inductance coil, the wires therefrom leading into proximity to the pairs of elements electrically connected to the secondary condenser, and means for simultaneously moving the secondary inductance coil of all the sets.

4. The combination with a primary variable condenser, of which one pole is adapted to be connected with an aerial and the other pole with the ground, a secondary variable condenser of which the poles are electrically connected with the detector, and a tickler, a series of pairs of movable conducting elements electrically connected respectively, one pair with the primary condenser, another pair with the secondary condenser, and the remaining pair with the tickler coil connections of the detector, a series of sets of inductance coils, wires from the inductance coils of each set leading into proximity to said elements to be electrically connected therewith by the movement of said elements, each set comprising a primary inductance coil, the wires therefrom leading into proximity with the pair of elements electrically connected to the primary condenser, a secondary inductance coil, the wires therefrom leading into proximity to the pairs of elements electrically connected to the secondary condenser, and a tickler inductance coil, the wires therefrom leading into proximity with the pairs of elements electrically connected to the tickler coil connections of the detector, and means for simultaneously moving the secondary inductance coils of all the sets and for simultaneously moving the tickler inductance coils of all the sets.

ERNEST BANCROFT.